United States Patent [19]

Ibrahim

[11] Patent Number: 4,623,187
[45] Date of Patent: Nov. 18, 1986

[54] PICK-UP TRUCK INSERT

[76] Inventor: Aftab Ibrahim, 24 Bondgate Court, Scarborough, Ontario, Canada, M1B 3A1

[21] Appl. No.: 657,951

[22] Filed: Oct. 5, 1984

[51] Int. Cl.$^4$ .......... B60N 1/00; B62D 33/00
[52] U.S. Cl. .................... 296/39 R; 296/10; 296/64; 296/66; 297/243; 297/DIG. 2; D12/98
[58] Field of Search ................ 296/10, 63, 64, 65 R, 296/66, 67, 69, 31 P, 39 R, 39 A; 297/DIG. 2, 243; 224/42.42; D12/98

[56] References Cited

U.S. PATENT DOCUMENTS

| | | | |
|---|---|---|---|
| D. 248,386 | 7/1978 | Hefner | D12/98 |
| 3,413,031 | 11/1968 | Gafvert | 296/63 |
| 3,550,948 | 12/1970 | Thompson, Jr. | 296/31 P |
| 3,632,156 | 1/1972 | Schweser | 296/31 P |
| 3,833,253 | 9/1974 | Butler | 296/69 |
| 3,840,263 | 10/1974 | Bowden | 296/64 |
| 4,161,335 | 7/1979 | Nix et al. | 296/39 R |
| 4,336,963 | 6/1982 | Nix et al. | 296/39 R |

FOREIGN PATENT DOCUMENTS

| | | | |
|---|---|---|---|
| 858419 | 12/1970 | Canada | 296/31 P |
| 1246867 | 10/1960 | France | D21/98 |
| 1451751 | 10/1976 | United Kingdom | 224/42.42 |

OTHER PUBLICATIONS

Commercial Car Journal, Jun. 1979, p. 220, Advertisement for Reversible Liner.

Primary Examiner—Robert B. Reeves
Assistant Examiner—Dennis H. Pedder

[57] ABSTRACT

The present invention provides a seat bearing insert for fitting in the bed of a pick-up truck. The insert is of a size to substantially fill and essentially eliminate horizontal movement in the truck bed and includes securing members for attaching to the truck to secure against vertical movement. The insert further includes forward and rearward sitting regions each having a seat for readily converting the truck bed to a sitting area and each seat comprises a seat portion and a backrest portion at generally right angles to one another, extending widthwise across the insert in a forwardly facing direction when fitted in the truck bed.

3 Claims, 4 Drawing Figures

4,623,187

PICK-UP TRUCK INSERT

FIELD OF THE INVENTION

The present invention relates to an insert for fitting in the bed of a pick-up truck. The insert includes at least one and preferably a number of seats for converting the bed of the truck to a seating area.

BACKGROUND OF THE INVENTION

In conventional pick-up trucks there is generally only seating room for three persons in the cab of the truck and the rear truck bed is used strictly for loading and hauling purposes. Therefore, when the truck bed is not being filled it is essentially unused space with very limited seating capacity in the truck.

SUMMARY OF THE PRESENT INVENTION

The present invention provides a seat bearing insert for fitting in the bed of a pick-up truck. The insert is of a size to substantially fill the truck bed to essentially eliminate horizontal movement and includes securing means for attaching to the truck to secure the insert against vertical movement when in the truck bed. The insert itself is provided with at least one seat for readily converting the truck bed to a sitting area when inserted into position.

The truck bed insert of the present invention is one which is easily fitted in position to substantially increase the passenger capacity of the truck and can just as easily be removed from the truck bed for loading and hauling purposes.

BRIEF DISCUSSION OF THE DRAWINGS

The above, as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
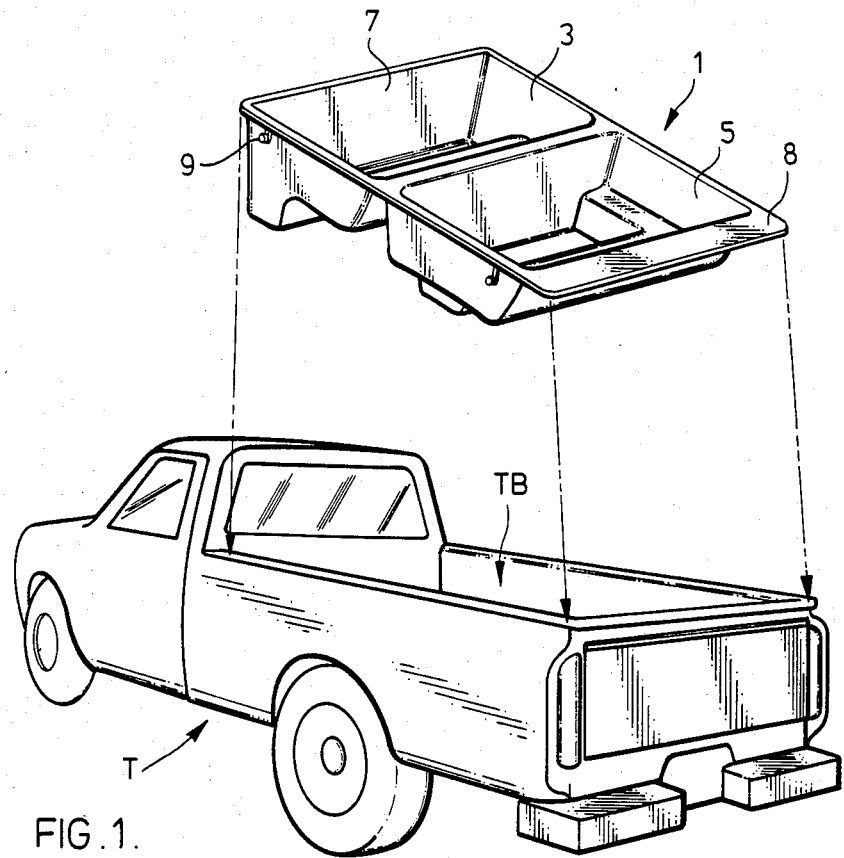
FIG. 1 is a perspective view looking down on a conventional truck with a truck bed insert according to a preferred embodiment of the present invention to be fitted into the bed of the truck.
Figure 2:
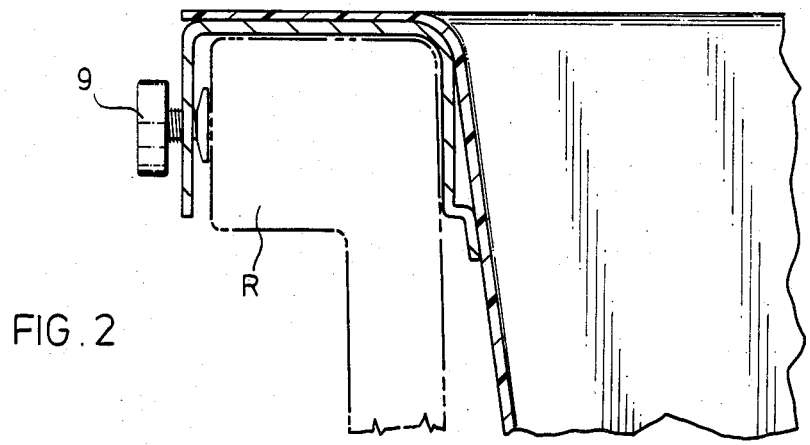
FIG. 2 is an enlarged sectional view showing the securing of the truck bed insert to the side wall of the truck bed.

FIG. 1 shows a pick-up truck generally indicated at T and having a truck bed TB. In accordance with the present invention, a truck bed insert, generally indicated at 1 is adapted to fit within the truck bed of the pick-up truck.

Figure 3:
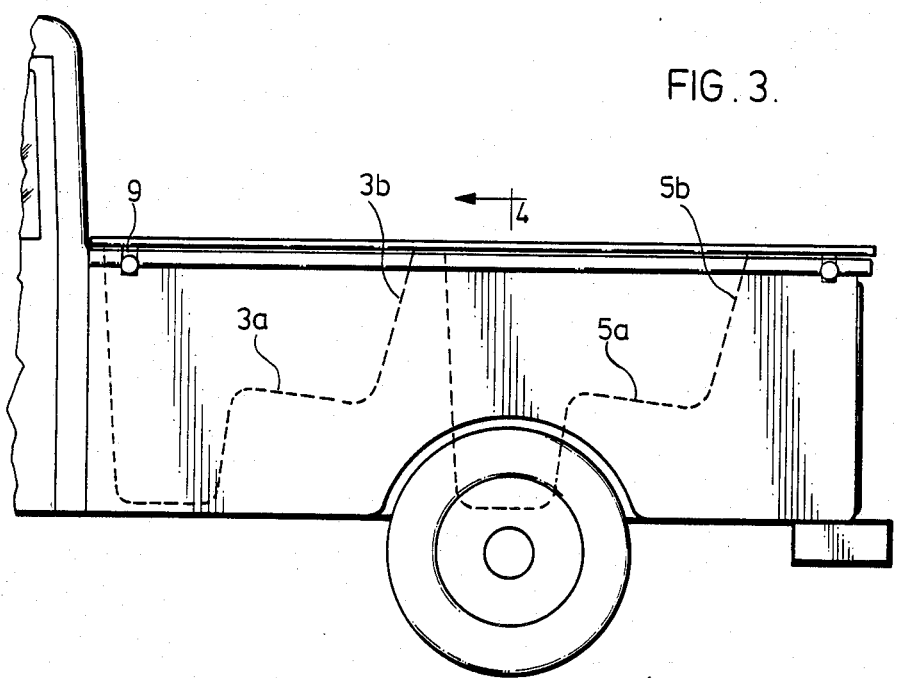
FIG. 3 is a side view of the truck bed with the insert fitted therein.

More particularly, truck bed insert 1 comprises a forward sitting region 3 and a rearward sitting region 5. The forward sitting region includes a forward seat having seat portion 3a and a backrest portion 3b while the rearward sitting region includes a rearward seat having seatrest portion 5a and a backrest portion 5b. Back rest portion 3b not only provides back rest support for but but also divides the forward seating region from the rearward seating region. The seat portion and the backrest portion in both the forward and rearward seats are positioned at generally right angles with respect to one another with each seat portion sloping downwardly rearwardly into it's respective backrest portion and with both the forward and rearward seats extending widthwise across and facing forwardly of the truck bed insert. As will be clearly seen in FIG. 3, insert 1 when fitted into the truck bed quickly and easily converts the truck bed to an area of increased seating capacity outside of the cab of the truck.

Figure 4:
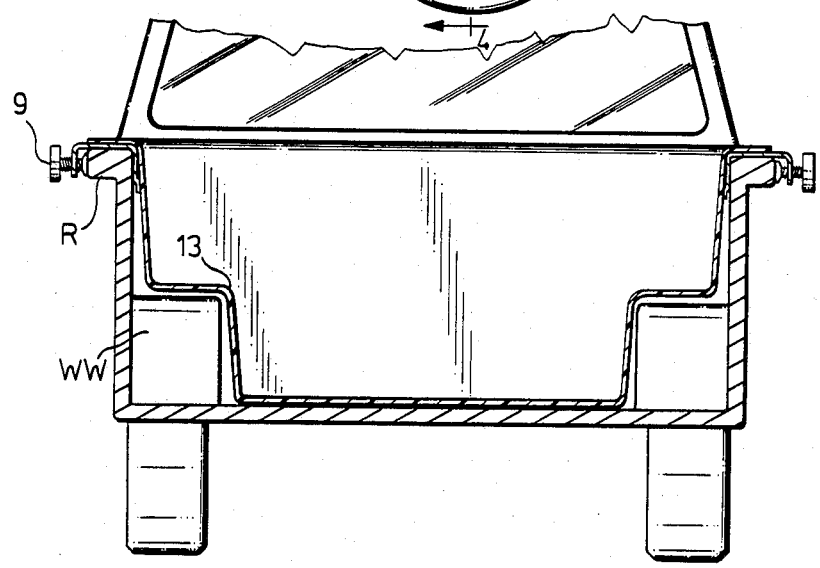
FIG. 4 is a sectional view taken alongs the lines 4—4 of FIG. 3.

From both a convenience and a safety standpoint, truck bed insert 1, which is preferably formed of a molded plastic with the seats themselves being formed during the molding operation, is of a size to substantially fill the truck bed. This allows the insert, which can very easily be handled by two persons, to simply be dropped into the truck bed where the forward wall 7 of the insert abuts to the back of the cab of the truck while the rearward portion 8 of the insert is located at the back of the truck bed. As will be seen in FIG. 4, the insert is molded with a recessed region 13 to each side for accommodating the wheel well WW in the truck bed. Therefore, once the insert is simply dropped into the back of the truck, the shape and size of the insert essentially eliminates all horizontal shifting within the truck bed. It is to be appreciated that most pick-up trucks are of a conventional size and shape, allowing the insert to be made in mass production to fit for many different types and styles of trucks.

The insert is further provided with a plurality of clamp arrangements 9 which, after the insert has been dropped into position, simply lock onto the rail R running around the upper edge of the truck bed. These clamps effectively lock the insert against any vertical shifting of movement once properly locked in position.

The seating regions in the insert can, as be appreciated, be provided with padded surfaces for making them just as comfortable as those found within the cab of the truck; furthermore, it is to be well understood that the insertion and removal of the insert is almost effortless and effectively converts the pick-up truck from a seating capacity of, for example, two to three persons to a seating capacity of, for example, six to nine persons; furthermore, when using the insert of the present invention the truck bed does not need to be swept out for cleaing purposes as any dirt or sediment sitting in the truck bed cannot pass up through the insert into the increased seating area.

Although various preferred embodiments of the present invention have been described herein in detail, it will be appreciated by those skilled in the art, that variations may be made thereto without departing from the spirit of the invention or the scope of the appended claims.

I claim:

1. A seat bearing insert for fitting in the bed of a pick-up truck, said insert being of a size to substantially fill the truck bed to essentially eliminate horizontal movement and including securing means for attaching to the truck to secure said insert against vertical movement when in the truck bed, said insert being provided with forward and rearward sitting regions each having a seat for readily converting the truck bed to a sitting area when inserted therein, each seat comprising a seat portion and a backrest portion extending widthwise across said insert at generally right angles to one another with said backrest portion being located rearwardly of said seat portion such that each seat faces in a forward direction when said insert is fitted in the truck bed.

2. A seat bearing insert as claimed in claim 1 wherein said securing means comprises a plurality of clamps located around said insert for clamping onto a sidewall of the truck bed.

3. A seat bearing insert as claimed in claim 1 wherein the seat portion slopes downwardly rearwardly into the backrest portion of each seat in said forward and rearward sitting regions.

* * * * *